(12) United States Patent
Matousek et al.

(10) Patent No.: US 7,877,757 B2
(45) Date of Patent: Jan. 25, 2011

(54) WORK ITEM EVENT MONITOR FOR PROCESSION OF QUEUED EVENTS

(75) Inventors: Jon F. Matousek, Redmond, WA (US); Rajesh Kamath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1297 days.

(21) Appl. No.: 11/418,864

(22) Filed: May 5, 2006

(65) Prior Publication Data

US 2007/0261063 A1 Nov. 8, 2007

(51) Int. Cl.
 *G06F 13/00* (2006.01)
 *G06F 11/00* (2006.01)
(52) U.S. Cl. .................. 719/318; 719/314; 714/100; 714/1; 714/2; 714/15; 714/25; 714/48
(58) Field of Classification Search .......... 719/314, 719/318; 714/100, 1–2, 15, 25, 48; 718/100–103
 See application file for complete search history.

(56) References Cited

U.S. PATENT DOCUMENTS

| | | | |
|---|---|---|---|
| 5,754,857 A | 5/1998 | Gadol | |
| 6,065,009 A | 5/2000 | Leymann et al. | |
| 6,115,646 A | 9/2000 | Fiszman et al. | |
| 6,253,369 B1 | 6/2001 | Cloud et al. | |
| 6,320,882 B1 * | 11/2001 | Patterson et al. | 370/522 |
| 6,505,228 B1 | 1/2003 | Schoening et al. | |
| 6,539,404 B1 | 3/2003 | Ouchi | |
| 6,662,199 B1 | 12/2003 | Flight et al. | |
| 6,668,281 B1 | 12/2003 | Ayyadurai | |
| 6,985,920 B2 * | 1/2006 | Bhattacharya et al. | 709/200 |
| 7,296,008 B2 * | 11/2007 | Passerini et al. | 1/1 |
| 7,409,587 B2 * | 8/2008 | Perry | 714/15 |
| 2002/0032692 A1 | 3/2002 | Suzuki et al. | |
| 2002/0138321 A1 | 9/2002 | Yuan et al. | |
| 2002/0170035 A1 | 11/2002 | Casati et al. | |
| 2002/0184610 A1 | 12/2002 | Chong et al. | |
| 2002/0188650 A1 | 12/2002 | Sun et al. | |
| 2003/0023834 A1 | 1/2003 | Kalafatis et al. | |
| 2003/0055668 A1 | 3/2003 | Saran et al. | |
| 2003/0115073 A1 | 6/2003 | Todd et al. | |

(Continued)

FOREIGN PATENT DOCUMENTS

IE 970169 9/1998

(Continued)

OTHER PUBLICATIONS

"Microsoft Computer Dictionary", 2002, Microsoft Press, Fifth Edition, p. 499.*

(Continued)

*Primary Examiner*—Qing Wu

(57) ABSTRACT

Detailed herein is a technology which, among other things, monitors the flow of events between a front-end application and a backend server. In one approach is technology, a new event is received at the backend server. This new event has an event type, which is used to set a new event flag, indicating that a new event of that type has been received. The new event is added to the queuing table. One or more events from the queuing table are selected, and a failover mechanism is maintained while selected events are being processed.

20 Claims, 6 Drawing Sheets

Flowchart 600

U.S. PATENT DOCUMENTS

| | | | |
|---|---|---|---|
| 2003/0204429 | A1 | 10/2003 | Botscheck et al. |
| 2004/0162741 | A1 | 8/2004 | Flaxer et al. |
| 2004/0177074 | A1 | 9/2004 | Leymann et al. |
| 2005/0022164 | A1 | 1/2005 | Takacsi-Nagy |
| 2005/0102185 | A1 | 5/2005 | Barker et al. |
| 2005/0120330 | A1 | 6/2005 | Ghai et al. |
| 2007/0005410 | A1* | 1/2007 | Kasravi et al. .................. 705/8 |

FOREIGN PATENT DOCUMENTS

| | | |
|---|---|---|
| JP | 62042251 | 2/1987 |
| WO | WO9945484 | 9/1999 |
| WO | WO2005022882 | 3/2005 |

OTHER PUBLICATIONS

International Search Report PCT/US2007/010918, dated Nov. 13, 2007, pp. 1-9.

Extended European Search Report regarding European Patent Application No. EP07794576.4 dated Nov. 12, 2009.

Official Communication from the European Patent Office regarding European Patent Application No. EP07794576.4 dated Jan. 13, 2010.

Office Action from the Patent Office of the State Intellectual Property Office of the People's Republic of China regarding Application No. 200780016111.X dated Mar. 10, 2010.

Asbjorn Rygg,"Bio-Workflows with BizTalk: Using a Commercial Workflow Engine for eScience",http://csdl2.computer.org/persagen/DLAbsToc.jsp?resourcePath=/dl/proceedings/&toc=co.

Jean-Denis Greze et al.,"Survivor: An Approach for Adding Dependability to Legacy Workflow Systems",http://www1.cs.columbia.edu/gskc/publications/survivor.pdf.

Pieter Van Der Hijden, "On the Development of Workflow based Asynchronou Group Simulations", http://www.sofos.nl/LinkedDocuments/05pvdh_isaga-paper.pdf.

Stefano Ceri,"Wide—A Distributed Architecture for Workflow Management",http://www.wi.uni-muenster.de/imperia/md/content/wi-information_systems/lehrveranstaltungen/lehrverans.

* cited by examiner

Work Item Event Monitor 400

WORK ITEM EVENT MONITOR FOR PROCESSION OF QUEUED EVENTS

BACKGROUND

In many software applications, particularly in a networked environment, one or more stateless front-end applications connects to a single, state-full, backend. Events, such as requests to access, modify, and remove various objects, are received at the front-end application, and are passed along to the backend. Often, multiple requests seeking access to the same object are received simultaneously, or nearly so. In most such applications, any such conflicting requests are addressed by locking down an object while it is being accessed.

When an object in a state-full backend is locked down, only the application whose request is currently being handled is allowed to access the object. In this way, object integrity is preserved, and corruption is avoided, as potentially conflicting access and modification requests are not performed simultaneously on the object.

A number of problems are inherent to this approach. For example, the object handler lacks a means of determining when a new event is received. The event dispatching mechanism cannot differentiate between an event that is already being processed, and one awaiting processing. And, as with most computer applications, a system failure results in a significant loss of time, as no record is retained of what events have been processed, are currently being processed, and remain to be processed.

SUMMARY

Detailed herein is a technology which, among other things, monitors the flow of events between a front-end application and a backend server. When multiple front-end applications seek to access the same object on the backend server, the requests are queued up in a queuing table. By ordering the queuing table according to the type of objects that are processed within the same batch, the process becomes more efficient. By incorporating a flag which is set when a new event is received, the event dispatching mechanism becomes aware of new events, without having to poll the queuing table. Flagging the events within the queuing table itself identifies which events are already being processed, as opposed to those events which still need to be processed. The implementation of a failover "event," and an associated monitor, allows the backend to detect system failures for selected events that are "in process"; by storing a "good" version of the queuing table, and maintaining the failover "event" on subsequent updates, the system can recover from a failure with minimal loss.

In one approach to the technology, a new event is sent to the backend. The new event has an associated event type. When a new event is received, a new event flag is set based on its associated event type, indicating that a new event of that particular event type has been received. The new event is added to the queuing table. Events are selected from the queuing table in groups, sometimes based upon the event type, and having an expiration time set to a time in the past, for processing. Each event in the processing group is marked, so that the system will prevent another business application from processing the same events in parallel. When processing is finished, the events are either deleted or updated, and if not deleted the processing mark is removed.

In another approach to the technology, a failover event is added to the queuing table, for example when one or more events are selected for processing. The failover guard event has an expiration timer. A failover event is monitored, and if the expiration timer lapses, a system failure has occurred, and the system needs to be restored. The expiration timer can be reset, for example by successfully accessing the queuing table during processing. A "good" state of queuing table is stored, so that if the expiration timer lapses, the queuing table can be restored to a known good version. A good version of the queuing table can be stored when, for example, the expiration timer is created.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

Figure 1:
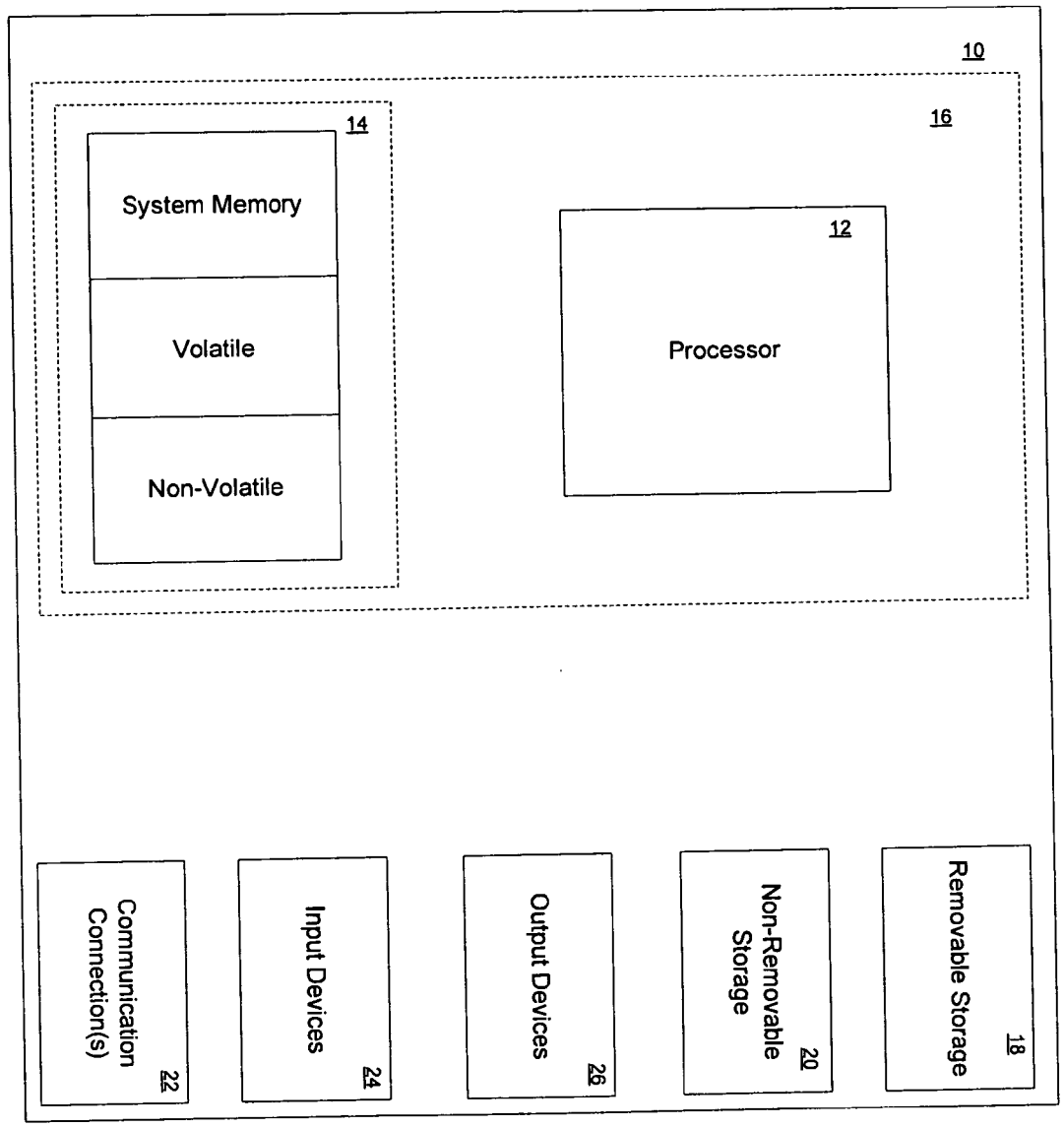
FIG. 1 is a block diagram of an exemplary computing system upon which embodiments may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system environment 10, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Vacation media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

A work item event monitor is described below. The work item event monitor, in some embodiments, operates on the backend of a server application, such as a web server or portal server environment. The monitor reconciles multiple competing requests from stateless front-end applications to the statefull objects available through the backend.

The work item event monitor uses a queuing table to track events received from the front-end applications which have not yet been delivered to the appropriate objects in the backend. The work item event monitor, in some embodiments, also serves as an event dispatching mechanism. By monitoring and modifying this queuing table in a number of ways, as described herein, the work item event monitor, in some embodiments, can inform objects about new events in a timely manner, can track whether a particular event has been or needs to be delivered, can recover from server system failure, and can make the queuing table more efficient.

Basic Computing Device

With reference to FIG. 1, an exemplary system for implementing embodiments includes a general purpose computing system environment, such as computing system environment 10. In its most basic configuration, computing system environment 10 typically includes at least one processing unit 12 and memory 14. Depending on the exact configuration and type of computing system environment, memory 14 may be volatile (such as RAM), non-volatile (such as ROM, flash memory, etc.) or some combination of the two. This most basic configuration is illustrated in FIG. 1 by dashed line 16. Additionally, computing system environment 10 may also have additional features/functionality. For example, computing system environment 10 may also include additional storage (removable and/or non-removable) including, but not limited to, magnetic or optical disks or tape. Such additional storage is illustrated in FIG. 1 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and nonremovable storage 20 are all examples of computer storage media.

Computing system environment 10 may also contain communications connection 22 that allow it to communicate with other devices. Communications connection 22 is an example of communication media.

Computing system environment 10 may also have input device(s) 24 such as a keyboard, mouse, pen, voice input device, touch input device, etc. Output device(s) 26 such as a display, speakers, printer, etc. may also be included. All these devices are well known in the art and need not be discussed at length here.

Computing Environment

Figure 2:
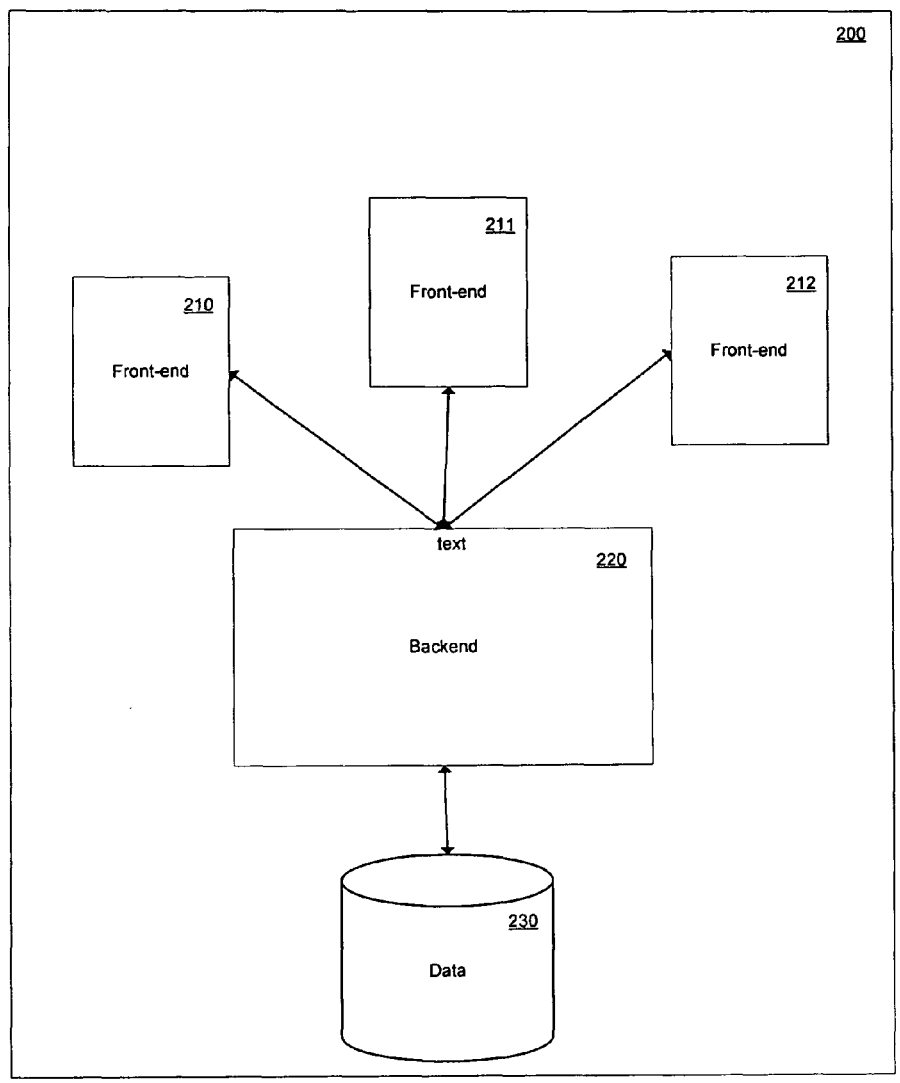
FIG. 2 is a block diagram of a computing environment, in accordance with one embodiment.

With reference now to FIG. 2, a system 200 is depicted, in accordance with one embodiment. While system 200 is depicted as containing certain features, it is understood that system 200 is only exemplary. In other embodiments, system 200 may contain additional, fewer, or different features than those depicted. Further, in some embodiments, listed features may be separated into multiple distinct elements, or combine into fewer elements.

As shown, system 200 depicts multiple stateless front-end applications 210, 211, 212 interfacing with a single state-full backend 220. In some embodiments, both the front-end applications and the backend may be implemented on a single computer system, such as computing system environment 10. In other embodiments, one or more of the front-end applications may be running remotely, and accessing backend 220 via a network connection, e.g., multiple web clients accessing a single web server. In other embodiments, front and applications 210, 211, and/or 212 communicate with backend 220 in other ways. Backend 220 shown is connected to data store 230. In some embodiments, data store 230 is a database, e.g., an SQL database. In other embodiments, data store 230 is implemented in other ways.

Figure 3:
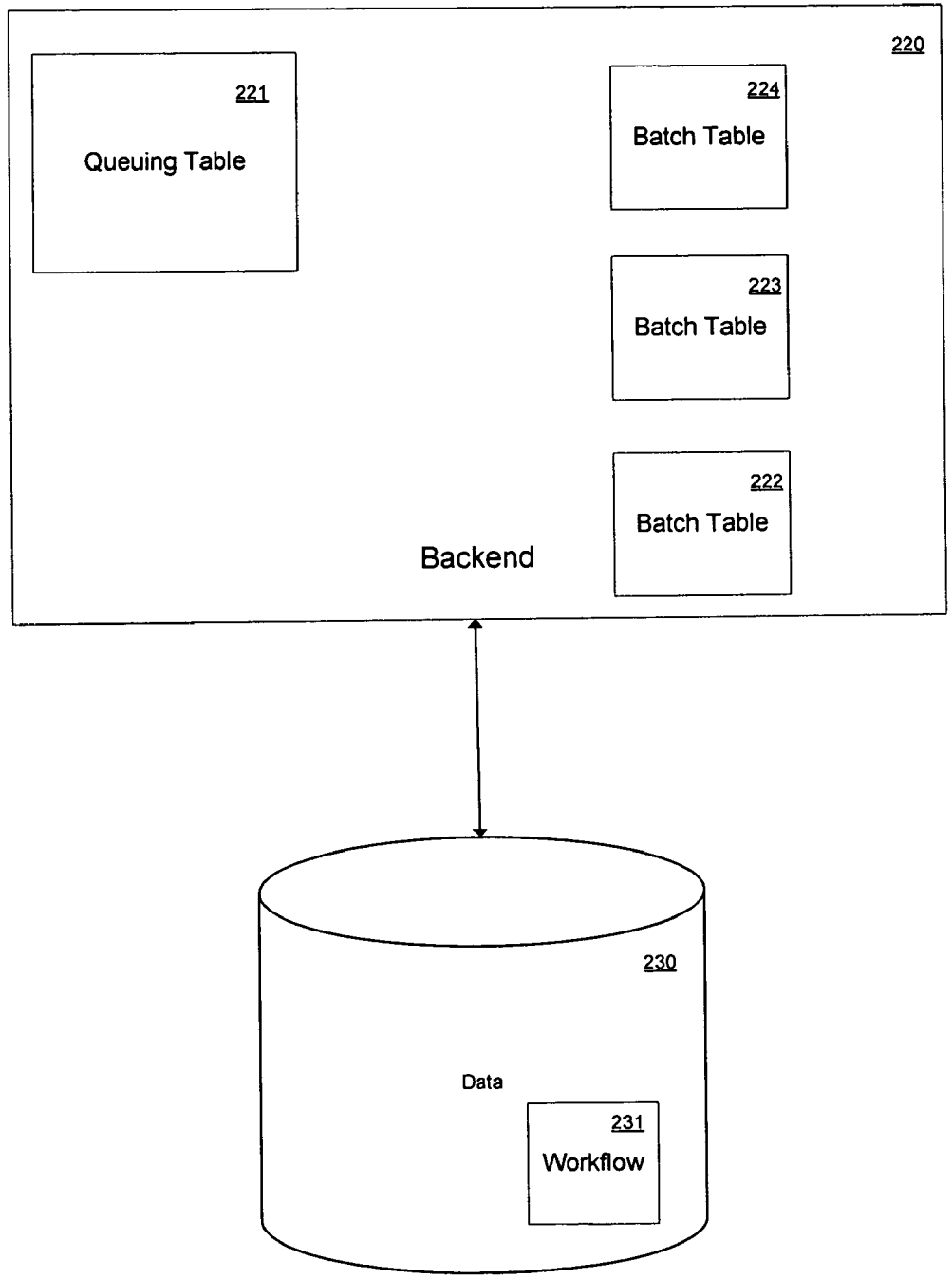
FIG. 3 is a block diagram of a backend, in accordance with one embodiment.

With reference now to FIG. 3, a detailed block diagram of backend 220 is provided, in accordance with one embodiment. While backend 220 is depicted as containing certain features, it is understood that backend 220 is only exemplary. In other embodiments, backend 220 may contain additional, fewer, or different features than those depicted. Further, in some embodiments, listed features may be separated into multiple distinct elements, or combine into fewer elements.

As shown, backend 220 contains a queuing table 221. Queuing table 221 is used by backend 220, in some embodiments, to retain the events received from the front-end applications until they can be delivered to the objects in data store 230. In some such embodiment, queuing table 221 is also used to order these requests, to make for more efficient processing.

Backend 220 is also depicted as containing several batch tables 222, 223, and 224. In some embodiments which include batch tables, events received from the front-end applications, as well as events generated by backend 220, are sorted into several batch types. Some or all of these batch types may have an associated batch table within backend 220. These batch tables can be used to store additional information needed to process events. Other embodiments omit the batch tables.

While FIG. 3 depicts queuing table 221 and batch tables 222 through 224 as being part of backend 220, it is understood that these tables may be stored, in some embodiments, in any location accessible to backend 220. For example, these tables may be stored in data store 230.

FIG. 3 also depicts data store 230, connected to backend 220. Data store 230 is shown as containing an object of the workflow type, workflow object 231.

Efficient Ordering of Events

The efficiency of the system, and in particular efficient handling requests, depend substantially upon what order events are passed out of the queuing table and to the intended objects. In some embodiments, the queuing table, or the index to the tune table, is ordered so as to speed this process.

One approach to queuing tables is to order the table by the time in which an event is to be processed. For example, when an event is passed from the front-end to the backend, it will often have an appended requested processing time. This processing time can indicate a priority, or level of urgency, for the request. For example, a real-time application seeking data from the backend, in real-time, may request that its events be handled quickly; meanwhile, events received from another, non-real-time, front-end application may be less urgent, and so have a longer available processing time.

In some embodiments, another approach to the ordering of the queuing table is implemented. In some such embodiments, the queuing table, or the index to the queuing table, is ordered by batch type. In this way, all jobs of a particular batch type are grouped together, and are then processed together. By ordering the queuing table according to the type of objects that are processed within the same batch, these embodiments gain a level of efficiency lacking in other approaches.

New Event Monitoring

One problem inherent to a queuing table approach to event management, is that, while the backend is aware of queued events, the event handlers for the various objects generally are not. In some approaches, this problem is addressed by polling the queuing table. The event handler for particular object is given access to the queuing table, and will periodically search through the queuing table for events directed at the object it handles.

In some embodiments, this problem is better addressed by monitoring events as they are added to the queuing table. In one embodiment, for example, the work item event monitor running on the backend monitors events as they are added to the queuing table. If the event is of particular batch type, e.g., an event for a workflow object, the work item event monitor updates a signal or flag, indicating that a new event of this type has been added. In some embodiments, this flag is available to the event handler for that particular object.

In one embodiment, the flag is a simple Boolean type, indicating whether there is a new event of this type, or not. In other embodiments, a more complicated flag system is utilized.

In some embodiments, the new event flag is located in the batch table for the appropriate batch type, e.g., the new event flag indicating a new workflow event is part of the batch table for the workflow object type. In other embodiments, the flag is located elsewhere.

Event Dispatching

Another question raised by the queuing table approach, is how an event dispatching mechanism determines whether an event has been passed to the appropriate event handler. In some embodiments, the approach used to address this question is to mark events within the queuing table itself.

In some embodiments, the event dispatching mechanism passes through the queuing table, identifying work items to be executed now. In some embodiments, this is accomplished by finding all work items related to a particular batch type, in the manner described above, with a processing time that has expired, or is about to expire. Passing through the queuing table in this manner will identify both events that have not been processed, and also events that are currently being processed.

In order to avoid passing duplicate events to multiple event handlers running on different front-end machines, events which are currently being processed need to be screened out. In some embodiments, this is addressed by tagging work items in the queuing table, to indicate that they have already been passed to an event handler. In some such embodiments, this tagging is in the form of a simple Boolean flag, indicating whether or not a particular event has already been addressed. In other embodiments, events are marked with an identifier, e.g., a globally unique identifier or GUID. In several embodiments, events are marked in such a way as to convey additional information. In another embodiment, other methods are used to identify events which have already been passed to the appropriate event handler. In some embodiments, this approach is inverted, in that the absence of a tag or mark indicates whether a particular event has already been addressed.

In some embodiments, untagged events are marked when they are selected for processing. For example, if events of the workflow type are to be processed, any event of the workflow type already tagged is ignored, while untagged events are tagged and passed to the event handler. In some embodiments, e.g., a SQL environment, this is a two-step process: first untagged events are marked, and then the newly tagged events are selected. In other embodiments, including other data storage environments, this process may require fewer or additional steps.

In some embodiments, events may not be removed from the queuing table when processing is complete. This situation can occur for various reasons, e.g., the event will require further processing at a later time, in order to be properly completed. In some such embodiments, when the current processing operation for the event has been completed, the tag indicating that the event is currently being processed is removed.

Failure Recovery

One concern inherent to computing applications is failure recovery. As applies here, if the backend server should fail with events in the queuing table, it would be beneficial for recovery process to incorporate some means by which the queuing table could be restored.

In some embodiments, the work item event monitor incorporates such a failure and recovery mechanism. In several such embodiments, the work item event monitor identifies system failure, and can revert to a previous version of the queuing table, when the system as known to be stable.

In some embodiments, this is accomplished by adding an event of the failover type to the queuing table. This event, in some embodiments, is generated by the work item event monitor. In other embodiments, other mechanisms may be response before the creation of this event. The failover event is added to queuing table, and is set to expire at a predetermined time, e.g., in 15 minutes from the time it was added. In some embodiments, whenever the queuing table has been touched, e.g., whenever work items within the queuing table are selected for processing and tagged with a processing ID, the expiration time for the failover event is reset.

Meanwhile, in some such embodiments, a failover guard module examines the queuing table every so often, e.g., every five minutes, and watches for failover events. If an expired failover event is detected, the work item event monitor knows that some system failure has occurred. In some embodiments, the system reverts to the state it was in when the failover guard module last successful checked the queuing table. In other embodiments, the system reverts to the state it was in when last the failover event was reset.

In some embodiments, the failover event is deleted when the last batch in the queuing table has been processed. In other embodiments, multiple failover events are utilized, each associated with a different batch type. In such embodiments, a failover event is added when a new batch enters the queuing table, and that failover event is deleted when processing for that batch is finished.

While certain lengths of time have been provided above for exemplary purposes, it is understood that the expiration time for the failover event and the frequency of operation of the failover guard module will vary with different embodiments. In some embodiments, these times are user configurable, such that a system administrator may determine the frequency at which these checks are performed.

Work Item Event Monitor

Figure 4:
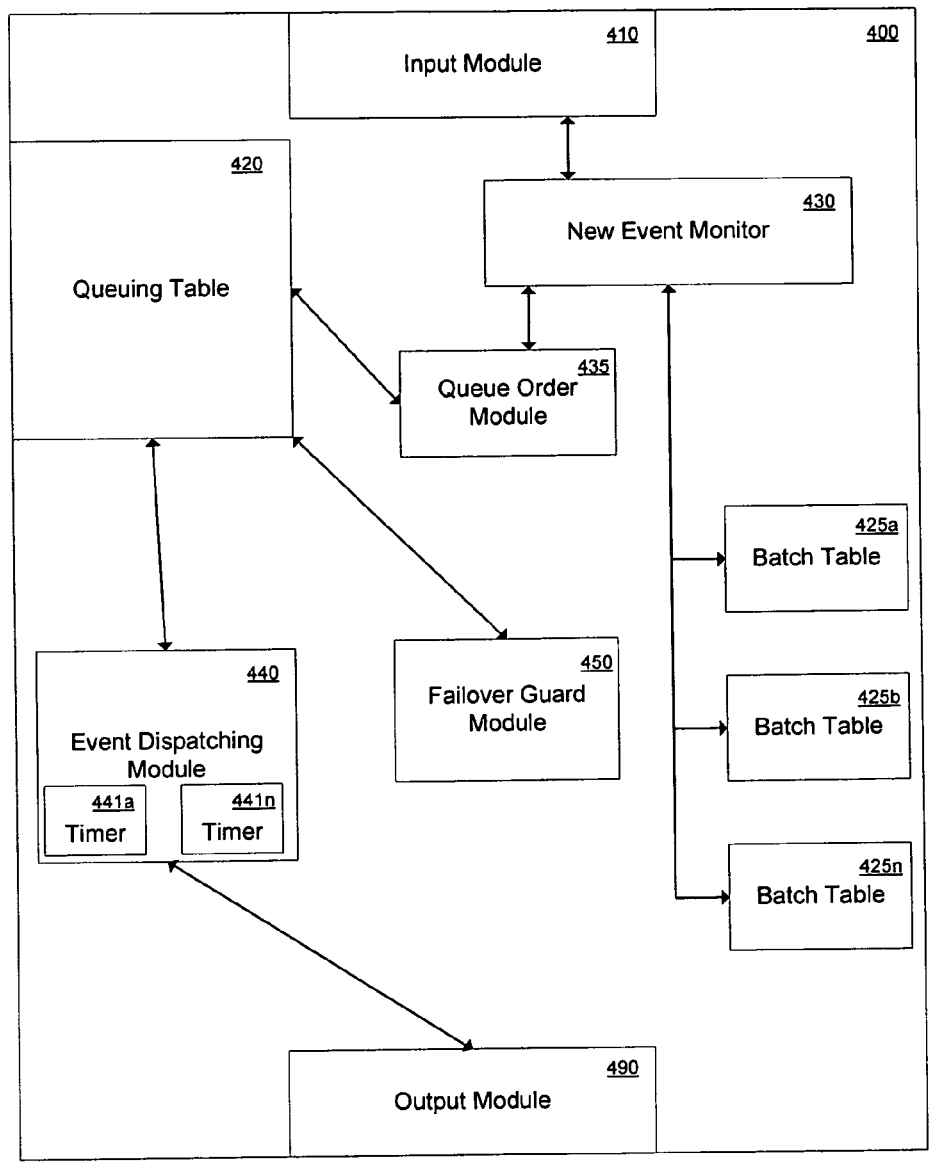
FIG. 4 is a block diagram of a work item event monitor, in accordance with one embodiment.

With reference now to FIG. 4, a block diagram of a work item event monitor is depicted, in accordance with one embodiment. While work item event monitor 400 is depicted as having specific components arranged in a specific fashion, is understood that work item event monitor 400 is intended to be exemplary, and not exclusionary. In other embodiments, a work item event monitor will have different components, and/or components arranged in a different fashion.

In the depicted embodiment, work item event monitor 400 is run as part of a backend server, e.g., backend 220. In other embodiments, work item event monitor 400 may be running at an alternative location.

Work item event monitor 400 is shown as having an input module 410. Input module 410, in the depicted embodiment, allows work item event monitor 400 to receive events from front-end applications, e.g., front-end 210. Work item event monitor 400 also has an output module 490, which is used in some embodiments to dispatch events to the appropriate event handlers, e.g., an object in data store 230.

Work item event monitor 400 is also shown as having a queuing table 420. Queuing table 420 is used to queue up events received from front-end applications. Work item event monitor 400 is also depicted as having a number of batch tables 425a through 425n. In some embodiments which include these batch tables, each batch tables associated with particular batch type, as used to store information pertaining to the handling of events for that batch type.

Work item event monitor 400 incorporates new event monitor 430, which monitors input received from input module 410, and identifies new events. Work item event monitor 400, as shown, includes queue order module 435. Queue order module 435, in some embodiments, arranges events in queuing table 420 for increased efficiency. In other embodiments, queue order module 435 modifies an index file to queuing table 420.

Work item event monitor 400 also includes event dispatching module 440. Event dispatch module 440 accesses queuing table 420, and identifies events to be handled. As shown, event dispatching module 440 incorporates several of timer jobs 441a through 441n. In some embodiments, each batch type has a separate associated timer job 441. In other embodiments, different numbers of timer jobs 441 are utilized.

Work item event monitor 400 also includes failover guard module 450. Failover guard module 450 monitors queuing table 424 expired failover events.

Operation of the Work Item Event Monitor

Figure 5:
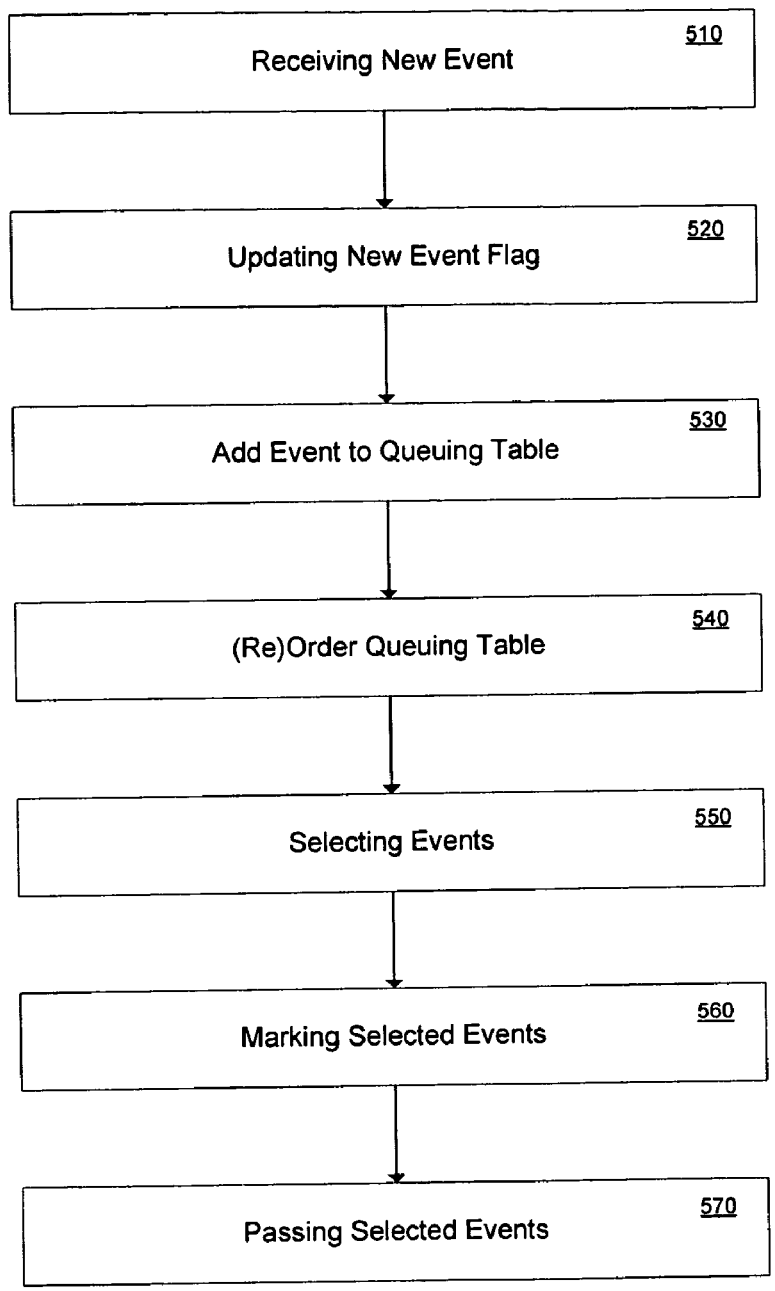
FIG. 5 is a flowchart of a method of utilization of a work item event monitor, in accordance with one embodiment.

With reference now to FIG. 5, a flowchart 500 of a method of utilization of a work item event monitor is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference now to step 510 and FIGS. 2 and 4, a work item event monitor receives a new event. For example, front end 210 submits an event to backend 220, which is received by input module 410.

With reference now to step 520 and FIG. 4, a new event flag is updated. In some embodiments, a new event flag corresponds to the type of work item event received. For example, if the event received is of the workflow type, new event monitor 430 would update the flag in the batch table 425 corresponding to the workflow type.

With reference now to step 530 and FIG. 4, the new event is added to the queuing table. For example, new event monitor 430 passes the received event queuing table 420.

With reference to step 540 and FIG. 4, the queuing table is ordered based upon batch type. In some embodiments, all events of the same batch type and with the same, or similar, expiration time are grouped together. For example, if work item event monitor 400 receives several events of the workflow type with expiration times in the past, these events will be grouped to be processed together.

With reference to step 550 and FIG. 4, events are selected for processing. In some embodiments, events are selected from the queuing table based upon job type and expiration time. In several such embodiments, only events which are not currently being processed are selected, e.g., only events not marked as already being processed are selected. For example, event dispatching module 440 selects all events, of the workflow type, and which are not already marked as being processed, and which are scheduled to execute now from queuing table 420.

In some embodiments, event selection is triggered by a timer. In some such embodiments, multiple timers are utilized, and a particular event type may have its own timer. For example, timer job 441a, which is associated with the workflow type, triggers the selection of workflow type events whenever it resets or expires. In other embodiments, a single timer is utilized. In some embodiments, event selection is triggered by other methods.

With reference now to step 560 and FIG. 4, the events selected are marked as being processed. As discussed above, in various embodiments, this step can be implemented in a number of points. For example, event dispatching module 440 identifies the selected workflow events in queuing table 420 by marking them with a GUID.

With reference now to step 570 and FIG. 4, the selected events are passed to the appropriate event handler. For example, the events selected by event dispatching module 440 are passed to output module 490 for processing.

Utilization of the Failover Guard

Figure 6:
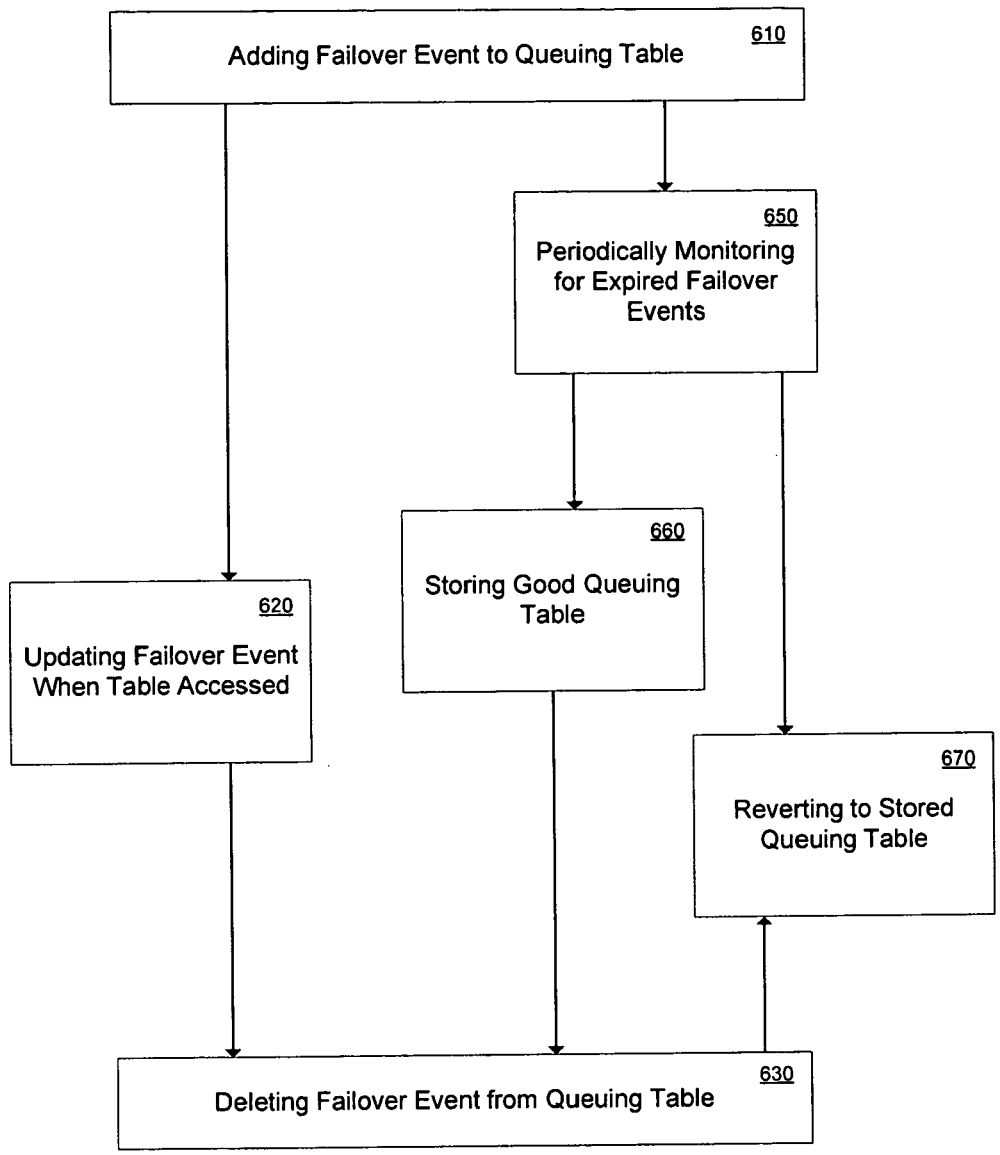
FIG. 6 is a flowchart of a method of a method of failure recovery, in accordance with one embodiment.

With reference now FIG. 6, a flowchart 600 of a method of failure recovery by utilizing a failover guard is presented, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610 and FIG. 4, a failover event is added to the queuing table. As described above, the mechanism for adding this event varies in different embodiments. In some embodiments, a failover event is added whenever a new event is added to the queuing table. In other embodiments, the failover event is added when a batch of events are selected for processing. For example, when a new event is received by input module 410, passed to new event monitor 430, added to queuing table 420, and a plurality of events are selected for processing in batch table 425, a failover event is added to queuing table 420

With reference now to step 620 and FIG. 4, the failover event is updated. As discussed above, the failover event is added to the queuing table with a preset expiration time. If the failover event is allowed to expire, this indicates the system has failed in some way. When the system performs normally, the failover event is updated before it expires, and the expiration time is reset. In some embodiments, the failover event is updated whenever the queuing table is accessed. In other embodiments, a failover event is updated when the queuing table is accessed for the event type the failover event is associated with. In some other embodiments, the failover event is updated by a failover event guard, as discussed previously.

With reference now to step 630 and FIG. 4, the failover event is deleted. In some embodiments, the failover event is deleted when the batch related to the failover event has finished processing. In some other embodiments, this occurs when no events remain in the queuing table. For example, when the queuing table 420 is empty except for the failover event, the failover event is deleted. In some embodiments, this is accomplished by the failover guard module 450. In other embodiments, this task is performed by event dispatching module 440. In other embodiments, other means are used to remove the failover event from the queuing table.

In other embodiments, including some where each event type has an associated failover event, the failover event is removed when no more events of the related event type remain in the queuing table.

As shown in flowchart 600, steps 650, 660, and 670 are looped, and run alongside step 620. In other embodiments, the steps may be performed in a different sequence.

With reference now to step 650 and FIG. 4, the queuing table is periodically checked for expired failover events. For example, failover guard module 450 monitors queuing table 420, checking queuing table 420 for expired failover events and every five minutes. If a failover event is present in the queuing table and has expired, the system knows that events remain in the queuing table, but no successful access of the queuing table has occurred since last the failover event was updated.

With reference now to step 660 and FIG. 4, if no expired failover events occur, the present state to queuing table is stored. For example, a failover guard module 450 checks queuing table 420 and finds no expired failover events, the current state of queuing table 420 is known to be good, and is stored. In some embodiments, the state of the queuing table is backed up every time the failover event is successfully updated, e.g., whenever the queuing table is accessed during processing, the failover event is updated, and the present state of the queuing table is backed up.

With reference now to step 670 and FIG. 4, if an expired failover event is located in the queuing table, the queuing table is returned to the stored state. If, for example, failover guard module 450 detects an expired failover event in queuing table 420, queuing table 420 needs to return to the last stored "good" state, e.g., the last state in which the failover event was updated. In some embodiments, the work item event monitor performs additional actions if an expired failover event is detected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operation of an event monitor in a computing environment, the event monitor tracking queued events that are to be processed, the method comprising:

receiving an event at said event monitor, said event comprising an event type property for a particular event type;

updating a new event flag based on said event type property of said event, said new event flag corresponding to said particular event type and indicating that a new event of said particular event type to be processed has been received;

adding said event to a queuing table, said queuing table containing a plurality of events that are to be processed for a plurality of event types;

determining that said queuing table contains one or more events of said particular event type without polling said queuing table based on said new event flag indicating there is a new event of said particular event type to be processed;
selecting for processing one or more events of said particular event type from said queuing table, resulting in a group of selected events of said particular event type that are to be processed together; and
marking, in said queuing table, said group of selected events to indicate that said group of selected events are being processed.

2. The method of claim 1, further comprising:
ordering said queuing table according to event type.

3. The method of claim 2, further comprising:
selecting said one or more events of said particular event type based on expiration times of said one or more events of said particular event type.

4. The method of claim 1, wherein said new event comprises an expiration time.

5. The method of claim 4, wherein said selecting comprises identifying one or more of said plurality of events having said expiration time.

6. The method of claim 1, further comprising:
outputting said group of selected events.

7. A computer-readable storage medium storing computer-executable instructions causing a computing device to perform the method of claim 1.

8. A method of operation of an event monitor in a computing environment, the event monitor tracking queued events that are to be processed, the method comprising:
receiving an event at said event monitor, said event comprising an event type property for a particular event type;
updating a new event flag based on said event type property of said event, said new event flag corresponding to said particular event type and indicating that a new event of said particular event type to be processed has been received;
adding said event to a queuing table, said queuing table containing a plurality of events that are to be processed for a plurality of event types;
selecting for processing one or more events of said particular event type from said queuing table, resulting in a group of selected events of said particular event type that are to be processed together;
marking, in said queuing table, said group of selected events to indicate that said group of selected events are being processed;
adding a failover event to said queuing table, said failover event comprising an expiration timer;
storing a good state of said queuing table;
monitoring said failover event and said expiration timer; and
if said expiration timer lapses, restoring said queuing table to said good state.

9. The method of claim 8, further comprising:
resetting said expiration timer upon successful access of said queuing table.

10. The method of claim 9, further comprising:
updating said good state of said queuing table.

11. The method of claim 10, wherein said updating said good state occurs upon successfully resetting said expiration timer.

12. The method of claim 8, wherein said monitoring comprises periodically accessing said queuing table.

13. The method of claim 8, wherein said adding a failover event is in response to processing an event from said queuing table.

14. The method of claim 13, further comprising:
deleting said failover event from said queuing table when said processing is finished.

15. A computer-readable storage medium storing computer-executable instructions causing a computing device to perform the method of claim 8.

16. A work item event monitor for tracking queued events that are to be processed in a computing environment, the work item event monitor including a processing unit executing computer-executable components stored in memory comprising:
a queuing table, for storing a plurality of queued events that are to be processed for a plurality of event types;
a new event monitor, coupled to said queuing table, for detecting the addition of a queued event to said queuing table, said queued event comprising an event type property for a particular event type;
a new event flag corresponding to said particular event type, coupled to said new event monitor, for indicating that a new queued event of said particular event type to be processed has been added to said queuing table; and
an event dispatcher, coupled to said queuing table, for:
selecting for processing one or more events of said particular event type from said queuing table, resulting in a group of events of said particular event type that are to be processed together, and
marking, in said queuing table, said group of selected events to indicate that said group of selected events are being processed;
wherein said work item event monitor:
adds a failover event to said queuing table, said failover event comprising an expiration timer;
stores a good state of said queuing table;
monitors said failover event and said expiration timer; and
if said expiration timer lapses, restores said queuing table to said good state.

17. The work item event monitor of claim 16, wherein said event dispatcher selects said one or more events of said particular event type from said queuing table based on expiration times of said one or more events of said particular event type.

18. The work item event monitor of claim 16, further comprising:
a batch table, coupled to said new event monitor, for containing said new event flag.

19. The work item event monitor of claim 16, wherein said event dispatcher further comprises a timer, said timer for indicating when to select said queued event.

20. The work item event monitor of claim 16, further comprising:
a failover guard monitor, coupled to said queuing table, for updating said failover event and resetting said expiration timer upon successful access of said queuing table.

* * * * *